Figure 1:
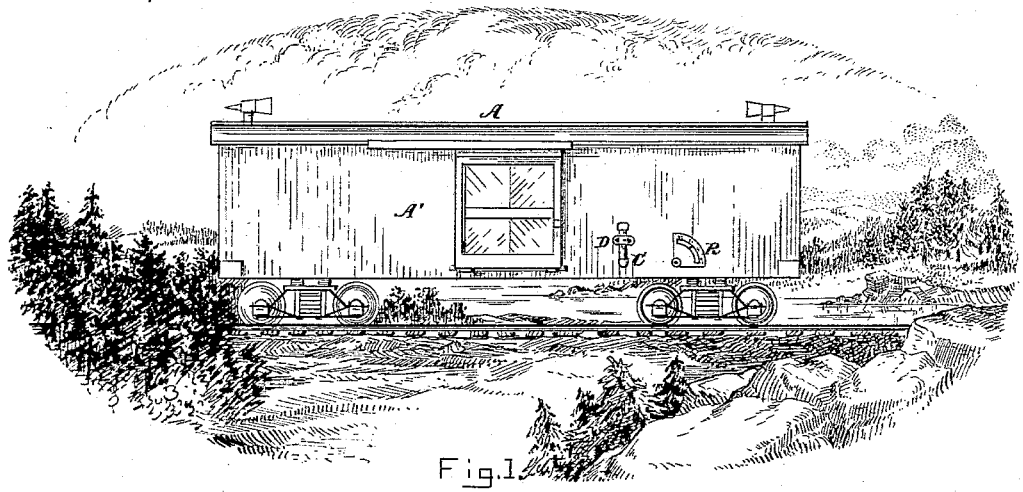

(No Model.)

W. E. EASTMAN.
FLOAT AND LEVEL INDICATOR FOR LIQUID RESERVOIRS.

No. 381,541. Patented Apr. 24, 1888.

Witnesses,
H. E. Remick.
H. E. Remick Jr.

Inventor,
Wm. E. Eastman,
Per H. E. Remick
his atty.

UNITED STATES PATENT OFFICE.

WILLIAM E. EASTMAN, OF BOSTON, MASSACHUSETTS, ASSIGNOR TO THE EASTMAN FREIGHT CAR HEATER COMPANY, OF PORTLAND, MAINE.

FLOAT AND LEVEL INDICATOR FOR LIQUID-RESERVOIRS.

SPECIFICATION forming part of Letters Patent No. 381,541, dated April 24, 1888.

Application filed April 7, 1887. Serial No. 234,079. (No model.)

*To all whom it may concern:*

Be it known that I, WILLIAM E. EASTMAN, a citizen of the United States, residing at Boston, in the county of Suffolk and State of Massachusetts, have invented a new and useful Improvement in Registering-Dials for Measuring Liquid-Levels in Closed Reservoirs, of which the following is a specification.

My invention has for its object the production of a reliable apparatus to accurately measure and indicate the fluid contents of reservoirs as particularly adapted to my system of heating freight-cars by oil-stoves, embodied and explained in United States Letters Patent, granted to myself and associates, bearing the following numbers, viz: 247,028, 248,924, 253,521, 269,189, and 308,955. Therein no method was provided to conveniently replenish and accurately indicate the successive levels of liquid fuel contained in said reservoir.

Obviously a sealed tank without adequate means whereby the rise of its contents could be accurately observed would necessarily occasion great inconvenience and loss of material. These difficulties have been experienced and overcome by the introduction of my present invention, whose purpose is to provide for such omission in the production of the apparatus whose construction is illustrated in the drawings annexed, wherein—

Figure 2:
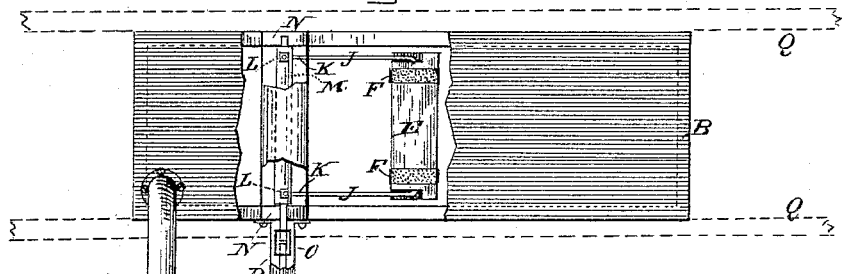
Figure 6:
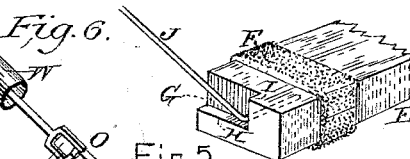
Figure 3:
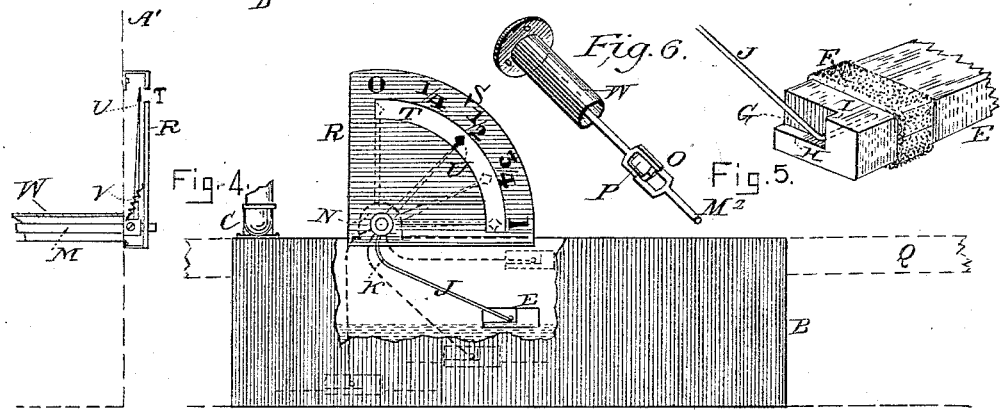

Figure 1 illustrates a transportation-car bearing my indicating apparatus. Fig. 2 is a top plan of the oil-reservoir detached from the car and broken away to disclose the float within. Fig. 3 exhibits a side elevation of said reservoir, also broken, with the indicating-dial in relative position to the quantity of liquid fuel therein. Fig. 4 is an end view of the dial and attached parts, while Fig. 5 exhibits the float construction in perspective. Fig. 6 designates a perspective view of the device establishing the union of the rock-shaft actuating the index.

Similar letters of reference designate like parts in the several views appended, referring to which—

A indicates the car, and B the reservoir containing liquid fuel, situated beneath the floor of said car, lying longitudinally therewith, and usually constructed of proportions to accommodate the spaces between the floor-sills, against which the sides of the tank abut, access to the interior when replenishing with oil being through the filling-tube C, lying parallel with the car-side A', strapped thereto in a vertical position, as at D, and furnished with a threaded sealing-cover, as shown. An oscillating float, E, is introduced within said reservoir, preferably of rectangular form, and provided with repercussive bands F F, of felt or other analogous material, to receive the shock imparted from the top of the tank, as would occur at intervals through the undulatory motion of its contents when the cars are in transit. The ends of said float have re-entering angles in its upper plane extending to about one-half its depth, as observed at G, Fig. 5, for the purpose of limiting the axial rotation of the same by the contact of the two walls H I of said angles with the reflexed supporting-arms J J, which are pivoted to the float in a manner to bring said arms within the area of said angles G, and to permit a prescribed rotary movement of the float as the liquid diminishes in the reservoir.

The fixed ends of the arms J J are curvated, as at K, to escape contact with otherwise obstructing parts, and are connected by threaded nuts L L to a rock-shaft, M, situated transversely with and journaled within the raised portion of the sides of the tank at N. To impart an independent movement and compensate for the oscillatory motion of the moving car, a disconnection is made at O and connection loosely re-established by a "union," P. The outer part of the shaft $M^2$ is of sufficient length to extend beyond the outer sill, Q, or car-side A', where it is journaled in and supported by the quadrantal plate R, bearing upon its outer face a numerical scale, as at S, Fig. 3, below which the segmental aperture T is made, through which the index-point U appears, said index-arm being fixedly attached to said outer part of the rock-shaft $M^2$, and is interposed between the side of the car, A', and said plate R, so that its point only is observable through said aperture T, enabling the attendant to observe the rise of the liquid contents within the reservoir through the movement of the index-hand actuated by the rise of the float on the successive fluid-levels shown in Fig. 3. To restrain somewhat the vibratory motion of said index-hand, a reacting helical spring, V, is attached by its lower end to the hand near its junction with the rock-shaft $M^2$, the other end being secured to the back of said plate R. (See Fig. 4.)

For the protection of the outer shaft a cylindrical or semi-cylindrical cover, W, is secured at its inner end to the tank or car bottom, its outer end assisting in the support of the shaft, which it covers, it being essential to prevent any derangement of the parts.

The operation and construction of my apparatus having been duly explained, I claim as my invention—

1. In combination with a rectangular float, E, constructed with re-entering angles G G, and repercussive bands F, adapted to operate within a closed reservoir to indicate its fluid contents, the quadrantal plate R, provided with an index, U, actuated by a duplex rock-shaft, M $M^2$, the restraining-spring V, semi-cylindrical covering W, and hermetic tank B, with its co-operative parts C D, substantially as and for the purpose described.

2. In combination with a quadrantal segmentally-slotted indicating-plate, R, index-arm U, and rock-shafts M $M^2$, a float, E, having re-entering angles G G within its ends to circumscribe its rotation and to receive the reflexed arms J J, by which it is suspended, as in the manner set forth.

In testimony whereof I hereunto affix my signature before attesting witnesses.

WM. E. EASTMAN.

Witnesses:
LOUIS T. HOWARD,
LYMAN SPALDING.